United States Patent [19]

Thill et al.

[11] 4,245,063

[45] Jan. 13, 1981

[54] THERMOSETTING POWDER COATING COMPOSITION COMPRISING VINYL INTERPOLYMER AND POLYCARBOXYLIC ACID

[75] Inventors: Bruce P. Thill; Donald A. Tomalia, both of Midland, Mich.

[73] Assignee: The Dow Chemical Company, Midland, Mich.

[21] Appl. No.: 951,544

[22] Filed: Oct. 16, 1978

Related U.S. Application Data

[63] Continuation-in-part of Ser. No. 443,264, Feb. 19, 1974, abandoned.

[51] Int. Cl.³ .............................................. C08L 39/00
[52] U.S. Cl. .............................. 525/329; 260/31.2 N; 525/336; 525/386
[58] Field of Search .................... 526/23, 56; 525/329, 525/336, 386

[56] References Cited

U.S. PATENT DOCUMENTS

| | | | |
|---|---|---|---|
| 3,216,974 | 11/1965 | Gijzen | 528/363 |
| 3,505,297 | 4/1970 | Sheetz et al. | 528/271 |
| 3,509,235 | 4/1970 | Reimhofer et al. | 526/56 |
| 3,752,793 | 8/1973 | Arlt et al. | 526/56 |
| 3,752,870 | 8/1973 | Labana | 260/836 |
| 4,011,381 | 3/1977 | Iwasawa et al. | 526/56 |

OTHER PUBLICATIONS

Miller—The Structure of Polymers, 1966, pp. 20–23.
Chemical Abstracts, vol. 83, 1975, 99317q.

*Primary Examiner*—Harold D. Anderson
*Attorney, Agent, or Firm*—L. Wayne White; Joyce P. Hill

[57] ABSTRACT

A thermosetting powder coating composition is disclosed herein. The composition comprises a solid pulverulent mixture of (A) a substantially linear vinyl addition interpolymer having a plurality of pendant 2-oxazoline and/or 2-oxazine groups, a number average molecular weight of from about 5,000 to about 25,000, and a melting point of from about 60° C. to 90° C., and (B) a solid polycarboxylic acid melting in the range of 70° C. to 175° C. which is included in an amount of from 0.75 to 1.25 carboxy equivalents per pendant oxazoline or oxazine group on the interpolymer. The utility of the above composition as a powder coating is further enhanced by inclusion of a plasticizer (e.g., a long chain monocarboxylic acid) and in practice, the powder compositions also normally include pigments and minor amounts of flow control agents. The instant powder coatings are applied by conventional techniques and cured at temperatures normally in the range of from about 150° C. to about 200° C.

10 Claims, No Drawings

THERMOSETTING POWDER COATING COMPOSITION COMPRISING VINYL INTERPOLYMER AND POLYCARBOXYLIC ACID

CROSS-REFERENCE TO RELATED APPLICATION

This application is a continuation-in-part of application Ser. No. 443,264, filed Feb. 19, 1974, now abandoned.

BACKGROUND OF THE INVENTION

1. Field of the Invention

This invention pertains to noval powder coating compositions which may be electrostatically applied to electroconductive substrates and subsequently thermally cured to give hard durable finishes.

2. Description of the Prior Art

There are several techniques for coating substrates with protective and/or decorative resinous materials. The three best known ways, however, are (1) applying the resin as a solution or emulsion thereof and evaporating the solvent (e.g., latex paints), (2) electrodeposition, and (3) electrostatic powder coating. The powder coating technique has advantages over the other two in that this technique makes more efficient use of the resinous coating materials than does the conventional spray coating of solvent-based systems and there are no solvent fumes being released, and the machinery used in the powder coating process is relatively inexpensive when compared to the capital outlay necessary for electrodeposition apparatus. These are substantial advantages which perhaps explain the continuing search by industry for new and better powder coatings.

Wingler et al. published a review article entitled, "Thermosetting Coatings Based on Acrylate-Styrene Copolymers for the Electrostatic Powder Spray Application" in Farbe Und Lack/Nr. 11, 1972. This article summarizes many of the techniques used in the electrostatic powder spray process.

Labana et al. describe various powder coating compositions based on ethylenically unsaturated glycidyl esters and dicarboxylic acids and flow control agents in U.S. Pat. Nos. 3,752,870 and 3,758,632 through 3,758,634.

Hartman et al. presented a technical review in Ind. Eng. Chem. Prod. Res. Develop. Vol. 12, No. 3, 166 (1973) on ambient curing polymer coatings. On page 1967 of this article, the authors described enamels based on oxazoline drying oils-acrylic copolymers which are alleged to be especially useful as automotive refinish enamels.

Arlt et al. described a powder coating composition in U.S. Pat. No. 3,752,793 which consisted of a mixture of (1)(a) a copolymer of styrene and certain substituted styrenes, acrylonitrile, methacrylonitrile or mixtures thereof, (b) acrylic acid esters, (c) methyl methacrylate, (d) acrylic acid, methacrylic acid, itaconic acid, maleic acid, fumaric acid, crotonic acid or mixtures thereof; which copolymer had an average molecular weight of from 3,000 to 20,000, and (2) a bis or trisoxazoline of a certain defined structure and (3) auxiliary agents such as pigments and flowing agents. Arlt et al. described a similar powder coating composition in German Offenlegungsschrift No. 2,155,257 wherein he replaced the bis and trisoxazolines in the aforementioned U.S. patent with certain bis and tris(5,6-dihydro-4H-1,3-oxazines). The Arlt et al. references represent the closest known art to the invention hereafter described. The "crosslink" in the polymers there-described have an ester group(s)

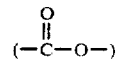

adjacent to the polymer backbone with internal amide

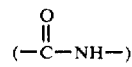

groups, and will therefore be referred to as ester-amides. This arrangement is the inverse of the instant polymers which are amide-esters.

SUMMARY OF THE INVENTION

We have discovered a novel thermosetting powder coating composition comprising a pulverulent solid mixture of:

(A) a substantially linear vinyl addition interpolymer of a monomeric 2-vinyl- and/or 2-isopropenyl-2-oxazoline and/or 2-vinyl- and/or 2-isopropenyl-5,6-dihydro-4H-1,3-oxazine, and an inert ethylenically unsaturated compound(s) in such proportions as to obtain an interpolymer having (1) a plurality of pendant 2-oxazoline and/or 2-oxazine groups, (2) a number average molecular weight ($\overline{M}n$) of from about 5,000 to about 25,000, and (3) a melting point of from about 60° C. to 90° C., said monomeric oxazoline and/or oxazine being present in the interpolymer in interpolymerized form in amounts of from about 10 to about 25 weight percent, based on the total weight of said interpolymer; and (B) a solid polycarboxylic acid having a melting point of from about 70° C. to about 180° C. Such acids are included in an amount of from about 0.75 to about 1.25 carboxy equivalents per pendant oxazoline or oxazine group on said interpolymer.

The utility of the instant coating compositions is further enhanced by incorporating therein a plasticizer selected from the group of long chain monocarboxylic acids and 2-hydrocarbyl-2-oxazoline or 2-hydrocarbyl-5,6-dihydro-4H-1,3-oxazine monomers wherein the hydrocarbyl substituent is likewise a "long chain" group herein defined as a hydrocarbon group of from about 10 to about 24 carbon atoms.

The instant coating compositions are easily applied by conventional powder coating techniques and are of excellent color. Additionally, they are superior to those described by Arlt et al. in that our compositions, after curing, have far superior impact resistant properties and superior resistance to weathering.

DETAILED DESCRIPTION OF THE INVENTION

The instant reaction may be illustrated as follows:

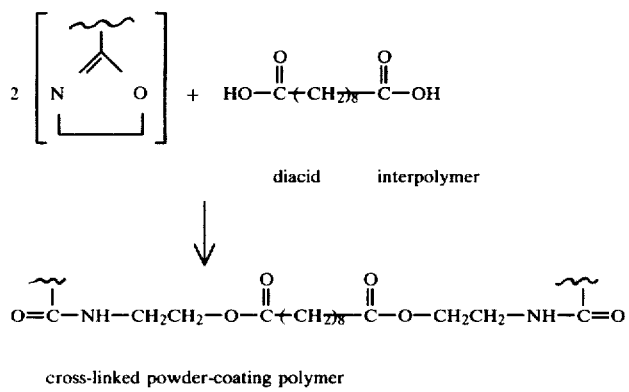

cross-linked powder-coating polymer

This is only one embodiment of the invention, of course.

The vinyl and isopropenyl oxazoline and oxazine monomers used in preparing the subject interpolymers are, of course, well-known. They are described, for example, by Wiley et al. in Chemical Reviews, Volume 44, 447–476 (1949) and by Frump in Chemical Reviews, 1971, Volume 71, No. 5483-505 and by Seeliger et al. in Angew, Chem. International Edition/Volume 5/No. 10, 875–888 (1966). Such oxazoline and oxazine monomers may bear various inert substituents on the other ring carbon atoms. Example of suitable such inert groups would be alkyl, hydroxymethyl, alkanoyloxymethyl, etc. Suitable such monomers therefore include 2-vinyl-2-oxazoline, 2-vinyl-5,6-dihydro-4H-1,3-oxazine, 2-isopropenyl-2-oxazoline, 2-isopropenyl-5,6-dihydro-4H-1,3-oxazine, 4-methyl-2-vinyl-2-oxazoline, 4,5-dimethyl-2-vinyl-2-oxazoline, 4,4-dimethyl-2-isopropenyl-2-oxazoline, 4,4-bis(hydroxymethyl)-2-isopropenyl-2-oxazoline, and the like.

Likewise, the inert ethylenically unsaturated compounds used as comonomers in forming the interpolymers comprise a well-known class of compounds. By "inert" we mean that such monomers do not react with said oxazoline or oxazine monomers except with and through the vinyl or isopropenyl substituent thereon. Such inert ethylenically unsaturated compounds must, of course, be copolymerizable with the oxazoline and oxazine monomers named above. The interpolymers are formed by merely blending one or more of the oxazine or oxazoline monomers with such inert ethylenically unsaturated monomer or monomers under conventional conditions for vinyl addition polymerizations. Such conditions are well-known in the art. The preferred number average molecular weight for the subject interpolymers is from about 5,000 to about 25,000.

The preferred monomers are 2-vinyl-2-oxazoline, 2-isopropenyl-2-oxazoline, and the corresponding vinyl and isopropenyl substituted oxazine monomers with the most preferred monomer being 2-isopropenyl-2-oxazoline. Of the inert ethylenically unsaturated compounds, the preferred comonomers are the $C_1$–$C_6$ alkyl acrylates or methacrylates, the $C_2$–$C_4$ β-hydroxyalkyl acrylates or methacrylates, acrylonitrile, methacrylonitrile, vinyl acetate, styrene, ortho or parachlorostyrene, $C_1$–$C_8$ alkylstyrene or α-methylstyrene. Of these, the most preferred monomers are the methyl and ethyl acrylates and methacrylates.

The polycarboxylic acid components are solid materials melting in the range from about 70° C. to about 180° C. The di- and tricarboxylic acids are the preferred acids in this group and the acids of choice are saturated aliphatic dicarboxylic acids having from 5 to 20 carbon atoms. Representative such acids are glutaric acid, adipic acid, azelaic acid, sebacic acid, decanedicarboxylic or dodecanedicarboxylic acids, and the like.

The polycarboxylic acid in the interpolymers may be blended in any convenient manner with best results being attained by a technique which will achieve an essentially homogeneous mixture. One manner in which this can be done is by a melt technique where the polyacid and the interpolymer are mixed at a temperature in which both are molten but below the curing temperature and the liquid melt resolidified and ground. This may be conveniently done by mixing the powders by mechanical means and then passing them through an extruder for short periods of time. The extruded portion can then be chopped into small particles and subsequently ground to the desired particle size.

It is also convenient at the time of blending to include a small but plasticizing amount of an alkanoic or alkenoic acid having a total carbon content of from about 12 to about 20 carbon atoms. Such materials react with the pendant oxazoline or oxazine moieties in the powder coating composition and are thus chemically bound plasticizers in the product. Generally, the plasticizer is included in amounts of up to about 25 percent of the total stoichiometric quantity of carboxylic acid in the powder coating composition. Representative examples of such plasticizers include palmitic acid, stearic acid, brassidic acid, and the like. Stearic acid is the plasticizer of choice, based on commercial availability and cost.

The powdered compositions may then be blended with conventional pigments, flow control agents, etc. and applied to the substrate by conventional powder-coating techniques. Such techniques are illustrated, for example, in the Wingler et al. article cited above. The coating is then thermally cured by warming the coated article at a temperature sufficient to cause the reaction. Satisfactory cure rates and flow-out have been observed at temperatures of from about 150° C. to about 200° C. At these temperatures, the cure (i.e., cross-linking) reaction is normally substantially completed in from about 10 to about 60 minutes. The finish thus produced is normally a hard, glossy, solvent-resistant finish having excellent physical properties, such as resistance to weathering and impact strength.

The following examples further illustrate the invention. In these examples, the word "parts" shall means parts by weight.

EXAMPLE 1

To a reactor equipped with a nitrogen sparger, reflux condenser, stirrer and thermometer was charged 170 parts toluene. The toluene was sparged with nitrogen for five minutes and heated to reflux under a pad of nitrogen (110° C.). To this stirred refluxing solvent was added over a two-hour period a solution of 90 parts ethyl acrylate, 80 parts methyl methacrylate, 30 parts 2-isopropenyl-2-oxazoline and 2 parts azo-bis-isobutyronitrile (AIBN). This was followed by 0.67 parts AIBN and 30 parts toluene delivered to the refluxing solution over 40 minues. After an additional 0.5 hour at reflux, the reaction mixture was cooled and weighed. The recovered solution was 392.5 parts (97.5 percent of theory). The solids content was found by heating at 160° C. for one hour in a circulating oven to be 48.9 percent. The toluene solvent was removed by evaporation from shallow trays in a vacuum oven maintained at 80° C./20-25 torr for 16 hours. The resulting polymer was analyzed with a Waters Associates model ANA-PREP Gel Permeation Chromatograph (GPC) combined with a Bausch and Lomb Viscomatic II viscometer; the polymer obtained had a number average molecular weight ($\overline{Mn}$) of 14,500 and a molecular weight distribution of 1.8. The molecular weight distribution, of course, was determined by dividing the weight average molecular weight ($\overline{Mw}$) by $\overline{Mn}$.

The "melting point" of the polymer was determined by placing finely divided (less than one millimeter) polymer of a Köfler Hot Bench, the lower limit of the range being the temperature at which the polymer agglomerated and became tacky, the upper limit being the temperature at which the polymer granules became spherical. By this technique the melting point was found to be 70° C.-88.5° C.

To 89 parts of this resin was added 5.5 parts stearic acid and 5.5 parts azelaic acid. The formulation was melt-mixed for five minutes on a two roll mill at 100° C., ground in a hammer mill and sieved to pass a 200 mesh screen. Phosphated 24 gauge steel panels were coated by electrostatic spray at −45 kilovolts (KV) charging potential to a cured film thickness of about two mil and cured at 175° C. for 30 minutes to give a cured film which was resistant to methyl ethyl ketone (MEK) for at least 35 double rubs under a two pound load. Cured polymer possessed a Gardner reverse impact of 10 inch-pounds and was smooth and glossy.

The Gardner reverse impact test is described in "Physical and Chemical Examination of Paints, Varnishes, Lacquers and Colors" by H. A. Gardner and G. G. Sward, Second Edition, page 188A (1950). Copies of which article have been distributed by H. A. Gardner Laboratories, Inc., in Bethesda, Mo.

EXAMPLE 2

To 100 parts of the polymer from Example 1 was added 17.4 parts of dodecanedicarboxylic acid and the components were melt-mixed, ground and sieved as in Example 1. A 24 gauge phosphated steel test panel was coated as per Example 1 and cured at 180° C. for five minutes to give a glossy coating with 100 percent adhesion as determined by a tape test hereafter described, it withstood 40 double rubs with MEK under a two pound loading, and had a Gardner reverse impact of 16 inch-pounds.

The tape test alluded to above comprised cross hatching the coated surface into 1/10 inch squares with a scribe, pressing a pressure sensitive tape down onto the crossed hatch area and ripping the tape away at a 90° angle. The percent coating remaining after this test is the percent recorded. In this instance none of the coating was removed by the tape. We used "Scotch ® Magic Tape" in our test.

EXAMPLE 3

To 100 parts of the polymer from Example 1 was added 77.5 parts of titanium dioxide (duPont R-966), 11.7 parts sebacic acid, 4.7 parts stearic acid and 0.3 parts flow control agent (Monsanto Modaflow ®). After melt-mixing, grinding and sieving to pass through a 200 mesh screen, the material was sprayed as in Example 1 onto phosphated steel panels and cured at 175° C. for 30 minutes to give a 2.0 mil coating. The coating had a 60° gloss of 85 percent, withstood greater than 100 MEK double rubs at two pound loading, had good leveling and a reverse impact strength of 80 inch-pounds.

EXAMPLE 4

Following the method of Example 1, a polymer was prepared from 95 parts ethyl acetate acrylate, 75 parts methyl methacrylate, 30 parts of 2-isopropenyl-2-oxazoline and a total 2.67 parts of AIBN, two parts added with the monomer and 0.67 parts added after the monomer addition was complete. A solid polymer was thus obtained which after removal of the toluene solvent was analyzed with a Waters Associates model ANA-PREP GPC combined with a Bausch and Lomb Viscomatic II viscometer and was determined to have had a number average molecular weight of 11,600, and a molecular weight distribution of 1.9. The polymer had a melting point of 63.5° C.-87° C.

To the 100 parts of this polymer was added 15.56 parts of decanedicarboxylic acid. After melt-mixing, grinding and sieving to pass a 200 mesh screen, a two mil thick powder coating was deposited on a 20 gauge phosphated steel panel. The coating had excellent solvent resistance and withstood more than 100 double MEK rubs under a two pound loading, it gave 100 percent adhesion under the tape test, it had excellent gloss and leveling properties and possessed a Gardner reverse impact strength of 26 inch-pounds.

EXAMPLE 5

To 100 parts of the polymer of Example 4 was added 77.5 parts of titanium dioxide (duPont R-966), 11.7 parts sebacic acid, and 4.7 parts of stearic acid. After melt-mixing, grinding and sieving to less than 200 mesh, the coating was electrostatically sprayed onto a phosphated steel panel as in Example 1 and the coating cured at 175° C. for 30 minutes to give a two mil coating. It had a 60° gloss of 81, it withstood about 100 MEK double rubs and had a reverse impact strength of 100 inch-pounds.

EXAMPLE 6

Following the method of Example 1, a polymer was prepared from 100 parts ethyl acrylate, 70 parts methyl methacrylate and 30 parts of 2-isopropenyl-2-oxazoline. A solid polymer was obtained upon removing the toluene solvent and analyzed by the GPC equipment described in Examples 1 and 4. GPC analysis revealed a polymer with a number average molecular weight of 11,000 and a molecular weight distribution of 2.5. The melting point of the polymer was from 62° C.-83° C.

To 100 parts of this polymer were added 9.6 parts azelaic acid and 9.6 parts stearic acid. After melt-mixing, grinding and sieving to pass a 200 mesh screen, the powder was applied electrostatically to phosphated steel panels and cured at 180° C. for five minutes. This gave a smooth glossy coating having excellent adhesion and good MEK resistance. It had a Gardner reverse impact strength of 44 inch-pounds.

EXAMPLE 7

To 100 parts of the polymer from Example 6 was added 9.14 parts of stearic acid and 9.41 parts azelaic acid. After melt-mixing, grinding and sieving to pass a 200 mesh screen, the powder formulation was coated onto a 24 gauge phosphated steel panel and cured at 175° C. for 30 minutes. This gave a 1.8 mil coating having good gloss and good leveling properties. It withstood approximately 35 MEK double rubs at a two pound loading and had a reverse impact strength of 64 inch-pounds.

EXAMPLE 8

To 100 parts of the polymer of Example 4 was added 79 parts of titanium dioxide (duPont R-966), 8.88 parts stearic acid and 9.46 parts azelaic acid. After melt-mixing, grinding and sieving to pass through a 200 mesh screen, the powder was electrostatically deposited on a 24 gauge phosphated steel panel and cured at 175° C. for 30 minutes. The two mil thick smooth coating thus obtained had a 60° gloss of 85, it withstood 50 MEK double rubs at a two pound loading, and had a reverse impact strength of 120 inch-pounds. After 1,000 hours of exposure to a Weather-Ometer ® accelerated weathering, the panel had not yellowed nor chalked and retained 74 percent of its original gloss.

A large X was scribed across the face of the panel through the coating into the steel. This scored panel was then placed into a salt fog environment at 95° F. and 100 percent relative humidity and held there for 362 hours. This is a very severe test and yet the coating showed no film failure (blistering or adhesion loss) and only 3/32 inch creep across the scribed area.

The above examples are merely illustrative of the excellent powder coating compositions we have discovered and described above and are not to be construed as limiting. Inherent in the above description is the need to accurately measure the number average molecular weight ($\overline{Mn}$) and molecular weight distribution (MWD) of the polymers described because the desirable properties for the subject interpolymers are those attributed to polymers having a $\overline{Mn}$ of from about 5,000 to about 25,000. Many properties of polymers such as solubility, elasticity, adsorption on solids, and tear strength depend on molecular weight (Rodriguez, F. *Principles of Polymer Systems*, New York, McGraw-Hill, 1970, p. 131) or diverse applications such as flow of melts and solutions, aging and weathering behavior, adhesion, and flocculation depend on MWD. See J. M. Hammond et al., *Journal of Polymer Science*, Symposium No. 49, "Gel Permeation Chromatography of Polymers," 1975, p. 119 and Rodriguez, supra at pages 121-2. Although $\overline{Mn}$ and MWD can be measured independently as discussed by Rodriguez, supra at page 125, the equipment used in the above examples was a Waters Associates of Milford, Massachusetts model ANA-PREP Gel Permeation Chromatograph (GPC) combined with a Bausch and Lomb Viscomatic II viscometer. Equipment, such as that manufactured by Waters Associates, was developed in 1964 and is now well-known and accepted in the industry for use in reliably and accurately determining both $\overline{Mn}$ and MWD of polymers in one measurement as reported above. See *Reviews in Macromolecular Chemistry*, Volume 7, L. H. Tung, "Recent Advances in Polymer Fractionation," (1971) pages 52, 53.

However, as reported by Hammon et al., supra at page 118, molecular weight averages and MWDs can be calculated according to a variety of methods; the method chosen will depend on whether one desires accuracy, reproducibility, or both. MWD determinations agree well with results from other techniques. See F. W. Billmeyer, Jr., *Textbook of Polymer Science*, 2d ed., New York, Wiley-Interscience (1971) page 56. One caveat should be kept in mind, however; M. L. Miller in *The Structure of Polymers*, New York, Reinhold (1966) at pages 20-23 discusses the precision with which various methods determine $\overline{Mn}$ indicating that certain methods are less accurate than others and that precision of measurement and correlation of values obtained by different techniques is often a function of polymer size and type, i.e., "Osmotic pressure measurements are convenient and reliable when number-average molecular weights are between 20,000 and one million, but cryoscopic and ebulliometric methods are preferred when number average molecular weights are less than 20,000". Miller, supra at page 20.

Billmeyer, supra at page 75 in Table 3—3 gives data comparing the $\overline{Mn}$ of polyethylene by various methods illustrating that the several methods listed gave excellent agreement. Thus, the current state-of-the-art reveals several techniques which may be used to determine Mn (i.e., osmometry, ebulliometry, cryoscopy), such methods having inherent variations or deviations within 5-10 percent of the true $\overline{Mn}$ values; but if the techniques are selected and used correctly, there should not be significant disagreement among the methods. Hence, an interpolymer which is the subject of this invention would have the desired properties and be within the scope of the claims if it had a Mn of from about 5,000 to about 25,000 since judiciously reliable, experimental variances would be accounted for by the term "about" at the extremes of the molecular weight range. As previously stated, the Mn of the subject interpolymers was measured with gel permeation chromatography equipment which is now considered a standard in the industry and is reported to be more reliable and precise than other techniques known to date.

We claim:

1. A thermosetting powder-coating composition comprising a pulverulent solid mixture of:
   (A) a substantially linear vinyl addition interpolymer of at least one member selected from the group consisting of a 2-vinyl-2-oxazoline, a 2-isopropenyl-2-oxazoline, a 2-vinyl-5,6-dihydro-4H-1,3-oxazine and a 2-isopropenyl-5,6-dihydro-4H-1,3-oxazine, and an ethylenically unsaturated compound(s) in such proportions as to obtain an interpolymer having
      (1) a plurality of pendant 2-oxazoline or 2-oxazine groups,
      (2) a number average molecular weight of from about 5,000 to about 25,000 as determined by gel permeation chromatography, and
      (3) a melting point of from about 60° C. to 90° C., said oxazoline or oxazine being present in the interpolymer in amounts of from about 10 to about 25 weight percent, based on the total weight of said interpolymer; and (B) a solid polycarboxylic acid having a melting point of from about 70° C. to about 180° C.; said acid being included in an amount of from about 0.75 to about 1.25 carboxy equivalents per pendant oxazoline or oxazine group on said interpolymer.

2. The composition defined by claim 1 wherein (A) is an interpolymer of 2-vinyl-2-oxazoline, or 2-isopropenyl-2-oxazoline or a mixture of said oxazolines, and an ethylenically unsaturated compound(s).

3. The composition defined by claim 2 wherein (A) is an interpolymer of 2-isopropenyl-2-oxazoline and an ethylenically unsaturated compound(s).

4. The composition defined by claim 1 wherein said ethylenically unsaturated compound(s) is: a $C_1$–$C_6$ alkyl acrylate or methacrylate; a $C_2$ to $C_4$ β-hydroxyalkyl acrylate or methacrylate; acrylonitrile; methacrylonitrile; vinyl acetate; styrene; o- or p-chlorostyrene; ar-($C_1$–$C_{18}$ alkyl)styrene or α-methylstyrene.

5. The composition defined by claim 4 wherein said ethylenically unsaturated compound is a $C_1$–$C_6$ alkyl acrylate or methacrylate.

6. The composition defined by claim 5 wherein said ethylenically unsaturated compound is methyl or ethyl acrylate or methacrylate.

7. The composition defined by claim 1 wherein (B) is a di- or tricarboxylic acid of up to 20 carbon atoms.

8. The composition defined by claim 7 wherein (B) is a saturated aliphatic dicarboxylic acid of from 5 to 20 carbon atoms.

9. The composition defined by claim 1 which consists essentially of:

(A) a substantially linear vinyl addition interpolymer of ethyl acrylate, methyl methacrylate, and 2-isopropenyl-2-oxazoline; and (B) azelaic acid, dodecanedicarboxylic acid, or sebacic acid.

10. The compostion defined by claim 9 wherein (B) is dodecanedicarboxylic acid.

* * * * *